United States Patent
Beatty et al.

(10) Patent No.: US 6,577,036 B2
(45) Date of Patent: Jun. 10, 2003

(54) DESIGN FOR FRAMELESS CARTRIDGE MOTORS

(75) Inventors: Reinhard Beatty, Blacksburg, VA (US); Richard A. Moughton, Christiansburg, VA (US); Jeffery T. Brewster, Dublin, VA (US)

(73) Assignee: Kollmorgen Corporation, Simsbury, CT (US)

( * ) Notice: Subject to any disclaimer, the term of this patent is extended or adjusted under 35 U.S.C. 154(b) by 0 days.

(21) Appl. No.: 10/067,117

(22) Filed: Feb. 4, 2002

(65) Prior Publication Data

US 2002/0121819 A1 Sep. 5, 2002

Related U.S. Application Data

(60) Provisional application No. 60/266,557, filed on Feb. 5, 2001.

(51) Int. Cl.[7] .............................. H20K 5/00; H20K 5/12; H20K 9/00
(52) U.S. Cl. .............................. 310/91; 310/91; 310/89; 310/42; 310/60; 310/114; 310/57
(58) Field of Search ................................ 310/91, 89, 42

(56) References Cited

U.S. PATENT DOCUMENTS

| | | | | |
|---|---|---|---|---|
| 4,544,334 A | * | 10/1985 | Ellis | 417/366 |
| 5,982,066 A | * | 11/1999 | Marracino et al. | 310/91 |
| 6,104,112 A | * | 8/2000 | Vanjani | 310/64 |
| 6,133,659 A | * | 10/2000 | Rao | 310/89 |
| 6,191,511 B1 | * | 2/2001 | Zysset | 310/60 |

OTHER PUBLICATIONS

Two sheets of Motor schematics, drawing number 120893, representing motors sold by Kollmorgen in May of 1998.

* cited by examiner

*Primary Examiner*—Nestor Ramirez
*Assistant Examiner*—Iraj A Mohandesi
(74) *Attorney, Agent, or Firm*—Morgan & Finnegan, llp

(57) ABSTRACT

A system and method is disclosed for the construction of a frameless cartridge motor. In accordance with one embodiment of the present invention a frameless cartridge motor is provided such that the motor's rotor is aligned with the motor's stator, a feedback device is calibrated and attached to the motor via a flexible member, and fasteners fix the rotor to motor's housing.

24 Claims, 6 Drawing Sheets

DESIGN FOR FRAMELESS CARTRIDGE MOTORS

This application claims the benefit of Provisional application No. 60/266,557 filed Feb. 5, 2001.

BACKGROUND OF THE INVENTION

This invention relates generally to permanent magnet synchronous motors constructed from rotor/stator component sets, or direct drive torque motors. These motors have been used for many years to optimize the space and performance of machines. The performance advantages are well known and include zero maintenance, clean mechanical assembly, reduced number of parts, better servo performance, better accuracy, and quiet operation.

Their use, however, has been limited to very special applications, which absolutely require their performance benefits. This is due to the very difficult integration and design time created by the use of frameless parts sets (rotor/stator) in an application. Quite often long periods of engineering consultation and design are required (along with Non-Recurring Engineering funds) to realize an implementation.

This difficulty results because these sets do not necessarily have housings or bearings which maintain a mechanical air gap between the rotor and stator components. The large magnetic forces between the rotor and stator, therefore, make assembly into a machine difficult, the difficulty increasing with the size of the motor. Considerable work, tooling and care must be taken to allow safe (to both people and the mechanism) and smooth insertion of the rotor component into the stator.

It is known in the art to solve some of the problems listed above using a rotor/stator combination where the rotor is aligned and locked to a housing holding the stator. In these prior art systems this locking is accomplished by bolting the rotor flush to the housing. Such a system, however, requires significant axial movement of the rotor during installation thereby creating difficulties during installation. Further difficulty is experienced because a feedback device must be mounted and angularly aligned at the time of installation, a delicate process requiring specialized equipment.

The safety, ease of assembly, and cost of integration problems described above are addressed by this invention.

SUMMARY OF THE INVENTION

The above identified problems are solved and a technical advance is achieved in the art by providing a frameless cartridge motor in accordance with the present invention.

The idea behind the cartridge motor of the present invention is to lessen the integration and application time for the motor and thereby make it easier to use for more applications. In the ultimate implementation of the idea, a motor (stator and rotor), housing, and feedback device are supplied as a single unit that can simply be mounted without the need to adjust the motor or mount or adjust the feedback device.

A cartridge motor is presented with an integral feedback device, so the motor can be mounted quickly and easily. To accomplish this the present invention provides a flexible mount for the feedback device that allows the installation of the feedback device at the factory where the motor is produced. In this arrangement the feedback device is already "zeroed" to the motor electromagnetics so that the electronic commutation is correct. Without the use of the present invention mounting the feedback device is cumbersome. It is also inaccurate since special equipment is needed to align or "zero" the device with the motor. So, the process becomes longer, more expensive, and tends to eliminate the advantages of the cartridge motor. The ideas in this disclosure allow the customer to mount an entire motor assembly in minutes, plug a cable in and run.

In an alternate embodiment a cartridge motor is presented with fasteners that do not require significant axial movement at the time of installation. This arrangement similarly reduces installation complexity.

Accordingly, it is an object of the present invention to provide a direct drive cartridge motor comprising a housing, a stator, a rotor and a fastener. Where the fastener is used to lock the rotor to the housing in an aligned and calibrated configuration for shipping, without requiring extensive axial movement at the time of installation.

It is a further object of the invention to provide a direct drive cartridge motor with an integrated feedback device comprising a housing, a rotor, a stator, a fastener and a feedback device mounted to the motor via a flexible member. Where the fastener is used to lock the rotor, stator and housing in an aligned and calibrated configuration for shipping. And, the flexible member keeps the feedback device angularly aligned with the motor, while allowing some degree of movement in other directions.

It is a further object of the present invention to provide a method for assembling a direct drive cartridge motor comprising, aligning a rotor and a stator, mounting a feedback device on to the motor with a flexible member, aligning the feedback device and fixing the rotor in its aligned configuration for shipment.

Other and further aspects of the invention will become apparent during the course of the following description and by reference to the attached drawings.

DETAILED DESCRIPTION OF THE INVENTION

The frameless cartridge motor design of the present invention provides all the advantages of direct drive torque motors while avoiding the increased difficulties that traditionally accompany direct drive systems. The cartridge motor of the present invention provides a direct drive motor that comes packaged so as to avoid difficult installations. This is accomplished by performing all the necessary alignments and adjustments at the motor's place of manufacture and then locking the stator in place. This locking allows the motor to maintain the adjustments and alignments made by the manufacturer. The motor is shipped to the end user and installed. During the installation the motor is unlocked and placed into its operating configuration.

Figure 1:
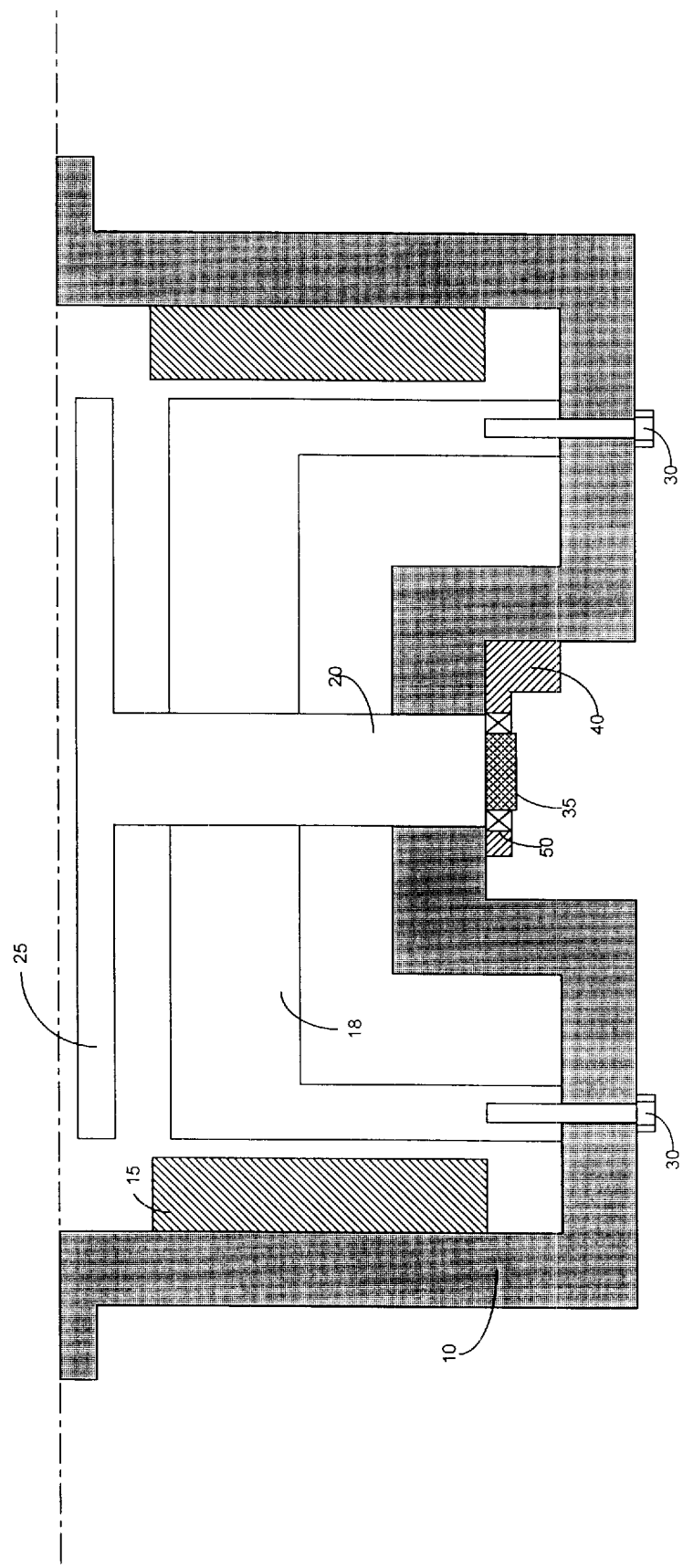
FIG. 1 shows a cartridge motor arranged for shipping in accordance with an exemplary embodiment with present invention.

FIG. 1 shows a cartridge motor arranged for shipping in accordance an exemplary embodiment with present invention. The cartridge motor is made up of housing 10, which supports stator 15. In alternate embodiments the housing can be sealed off from the environment and/or the stator can be liquid cooled. Naturally, the motor further includes rotor 18 disposed around motor shaft 20. The motor shaft also has platen 25 that is used to attach motor to the drive shaft of the driven machine.

At the time of manufacture the parts of the cartridge motor are assembled and adjusted for proper operation. The rotor and stator are aligned to form the proper air gap between the two. The rotor is then locked into place. Locking the rotor and stator in place maintains the proper adjustments during shipping, thereby easing installation at the end user's device. This locking can be accomplished a number of ways. For example, as shown in FIG. 1, shipping bolts 30 fix the rotor to the housing, thereby maintaining proper radial alignment.

The feedback device 40 is also installed at the time of alignment. The feedback device rotor 35 is affixed to the motor shaft via flexible mounting plate. This flexible mounting plate maintains angular alignment while allowing some radial and axial movement. Alternately, the feedback device stator could be mounted to the motor stator via a flexible coupling and the feedback device rotor rigidly mounted to the motor rotor. Feedback rotor 35 thereby tracks the angular movement of the motor shaft and communicates that movement to feedback device 40.

The cartridge motor of FIG. 1 only requires one bearing 50. Moreover, this bearing is only used to maintain a constant air gap between the feedback device 40 and the feedback rotor 35 when it is attached with the flexible member. Accordingly, the cartridge motor design greatly reduces the number of parts that might fail due to wear, thereby increasing the usable life of the device.

Figure 2:
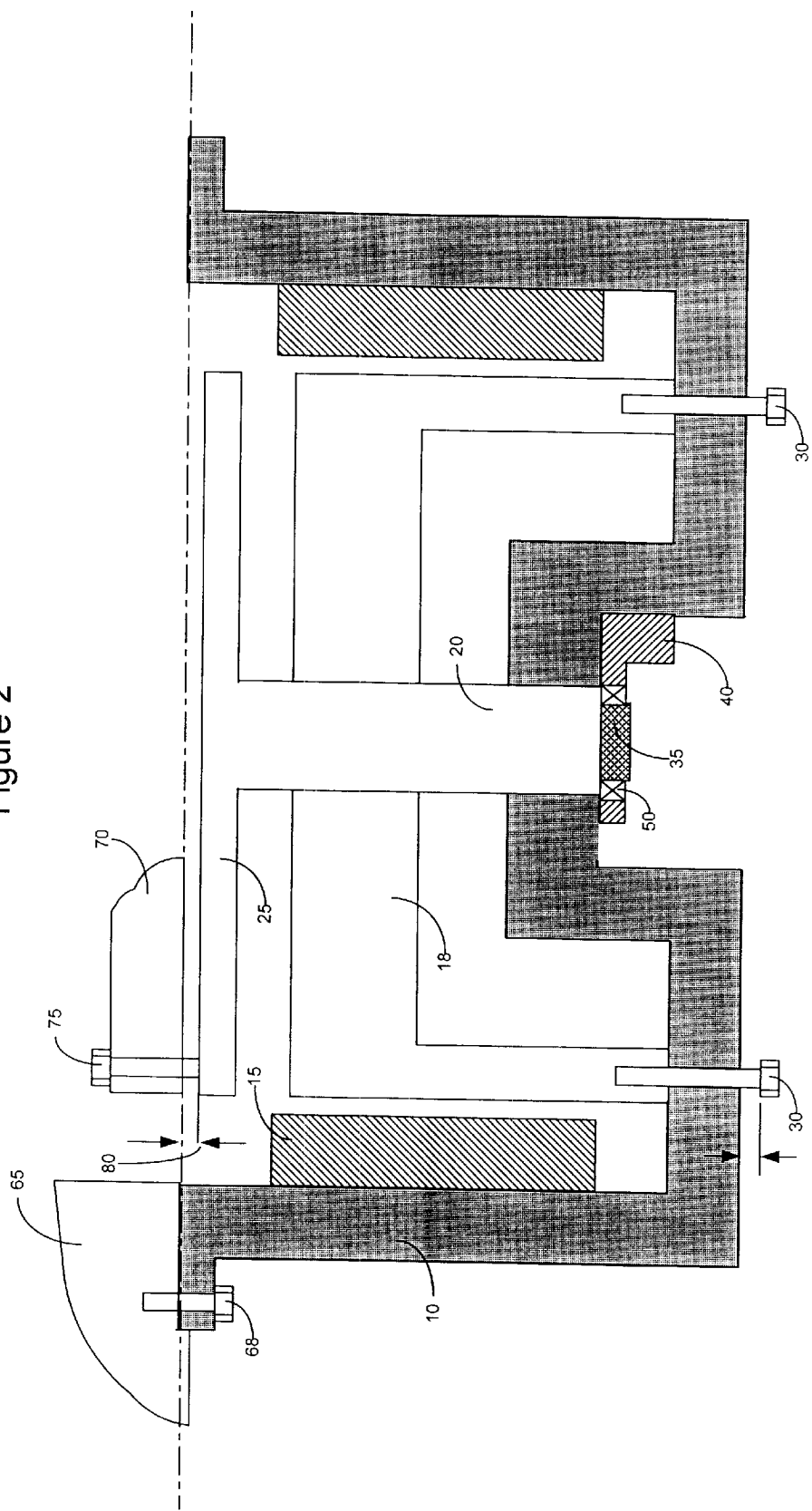
FIG. 2 shows a cartridge motor partially mounted to a recipient machine in accordance with an exemplary embodiment of the present invention.

FIG. 2 shows the cartridge motor of FIG. 1 partially mounted on a recipient machine. The motor housing 10 is fixed to recipient machine body 65 via bolts 68. This anchors the stationary portion of the motor. Motor platen 25 is partially fixed to the drive shaft 70 of the recipient machine by bolts 75. Features on the platen and the drive shaft pilot them together to ensure proper alignment. At this stage of the installation bolts 75 are not tightened and a gap 80 is maintained between the drive shaft and the platen. With the rotor and housing fixed to the recipient machine, shipping bolts 30 can begin to be loosened because the piloting features of the recipient machine will maintain proper alignment for the motor. With bolts 30 loosened shaft 20 is free to move axially.

Figure 3:
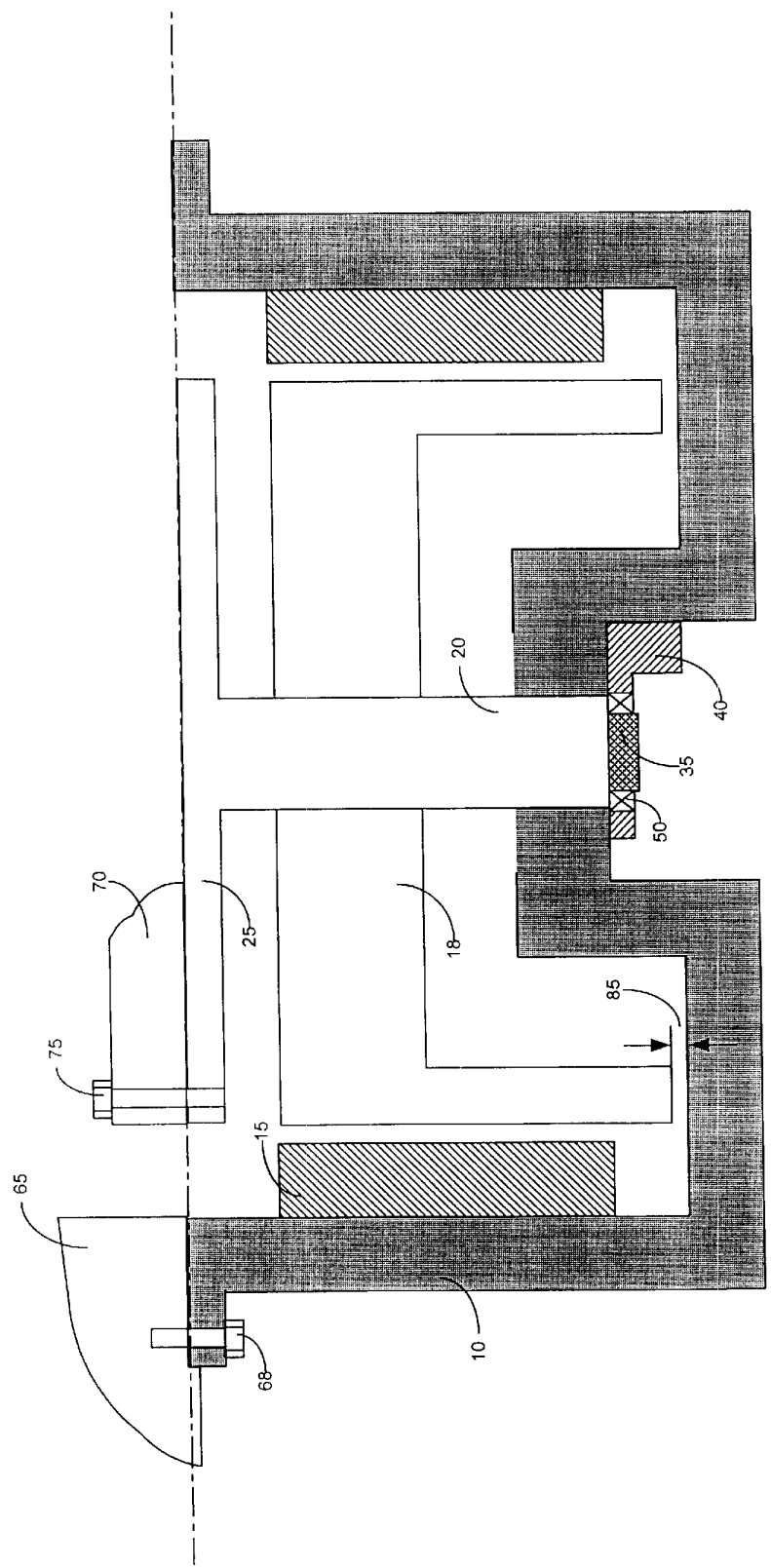
FIG. 3 shows a cartridge motor mounted to a recipient machine in accordance with an exemplary embodiment of the present invention.

FIG. 3 shows the cartridge motor of FIG. 1 fully mounted on the recipient machine. This result is achieved by tightening bolts 75 and removing shipping bolts 30. As bolts 75 are tightened the platen is pulled toward drive shaft 70 thereby closing gap 80. This process also pulls rotor 18 away from the housing and opens gap 85, thereby leaving the rotor free to rotate. With the rotor tightly affixed to the recipient machine and the rotor free to turn the motor is ready for operation.

Figures 4A, 4B:
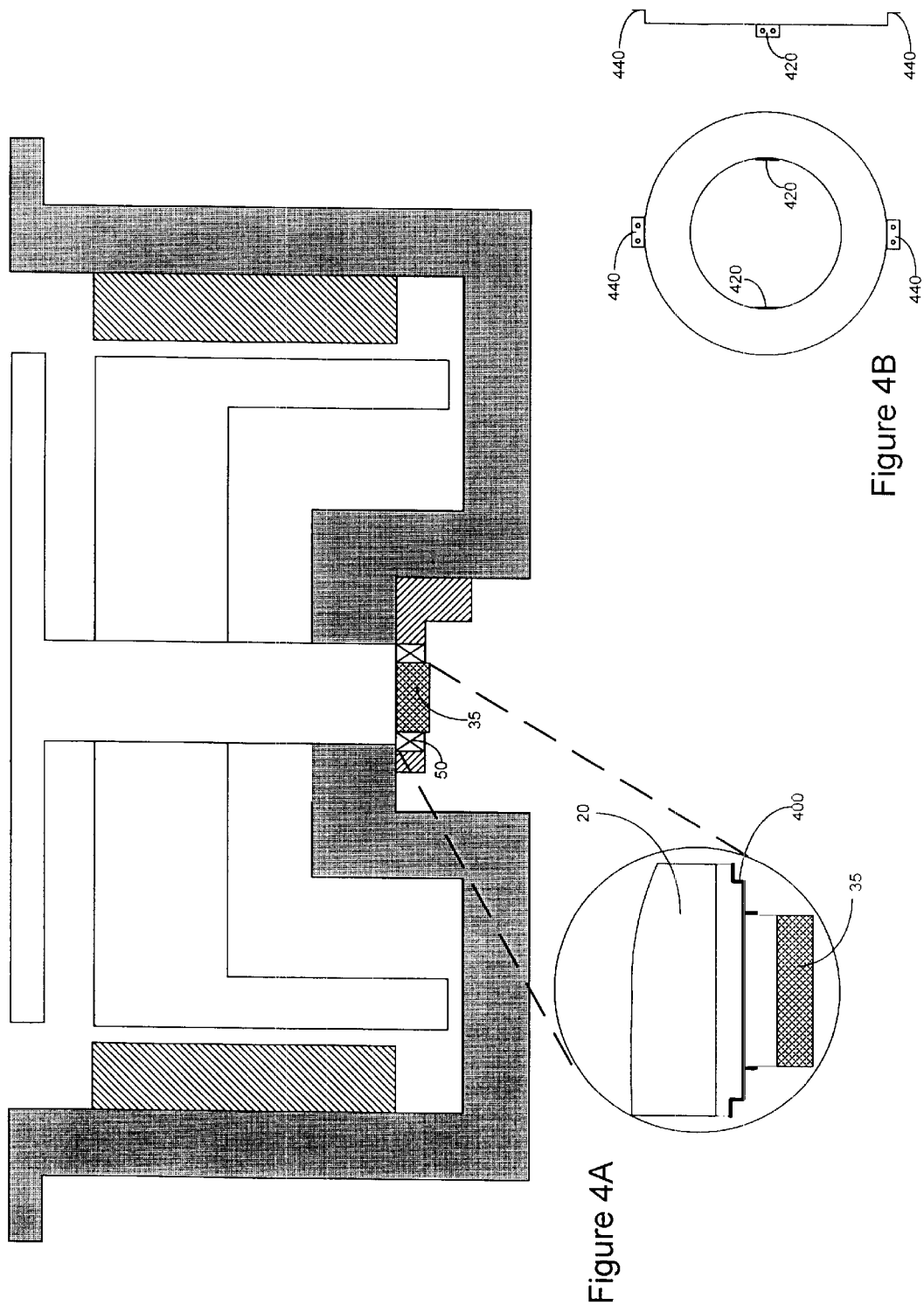
FIG. 4A shows a cartridge motor with an exploded view depicting a flexible feedback mount in accordance with an exemplary embodiment of the present invention.
FIG. 4B shows front and edge-on views of a flexible feedback mount in accordance with an exemplary embodiment of the present invention.

Feedback devices are difficult to install and align, therefore they would also benefit from pre-assembly at the time of manufacture. FIGS. 4A and 4B show a flexible feedback mount in accordance with an exemplary embodiment of the present invention. A flexible feedback member 400 allows the pre-installation of the feedback device, while still allowing axial and other movement during installation. The flexible feedback coupling also facilitates the integration of the feedback device by allowing the feedback bearing 50 to support the feedback rotor with a high level of precision.

As shown in FIG. 4A, the flexible feedback member attaches to feedback rotor 35 and to shaft 20. FIG. 4B shows the structure of an exemplary embodiment of a flexible feedback member. This particular flexible feedback member consists of flat piece of sheet metal with 2 L-shaped tabs 420 bent up on the inside for mounting to the feedback rotor and 2 L-shaped tabs 440 on the outer diameter for mounting to the motor shaft. The coupling accommodates axial and radial motion due to run-out, tolerance variation and thermal expansion, while providing a relatively high rotational stiffness.

Figure 6:
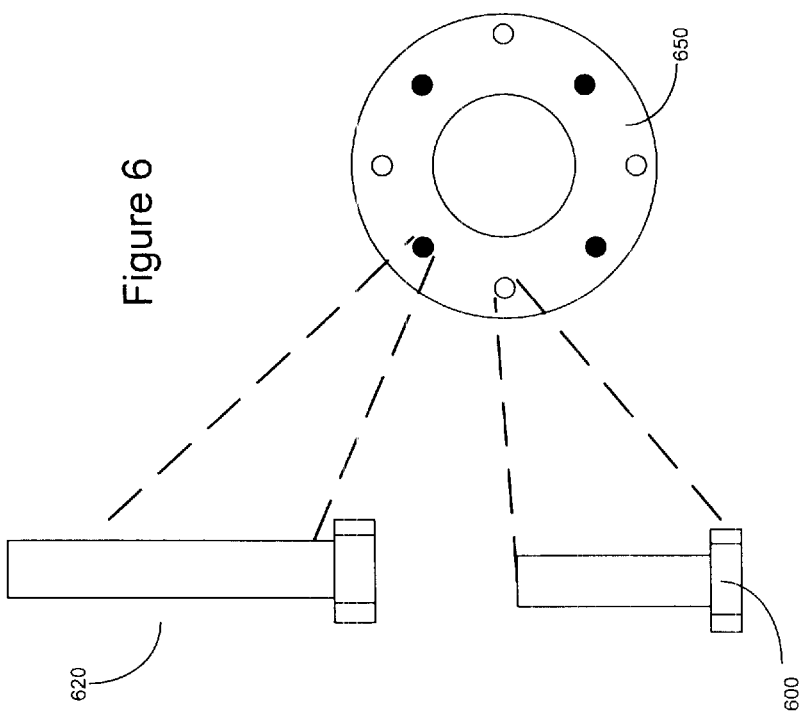
FIG. 6 shows an alternate shipping bolt arrangement in accordance with an exemplary embodiment of the present invention.
Figure 5:
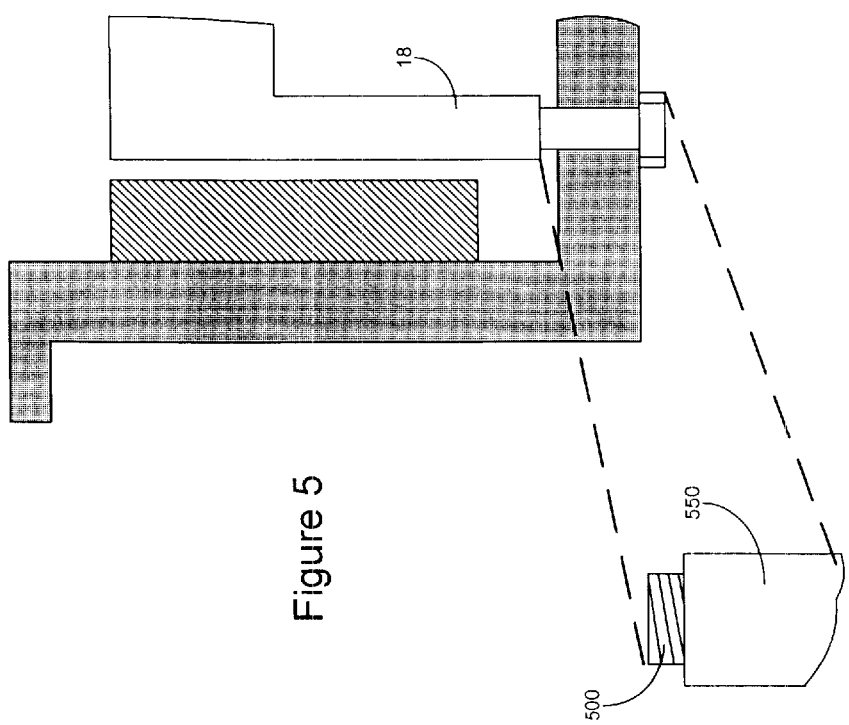
FIG. 5 shows an alternate shipping bolt in accordance with an exemplary embodiment of the present invention.
Figure 7:
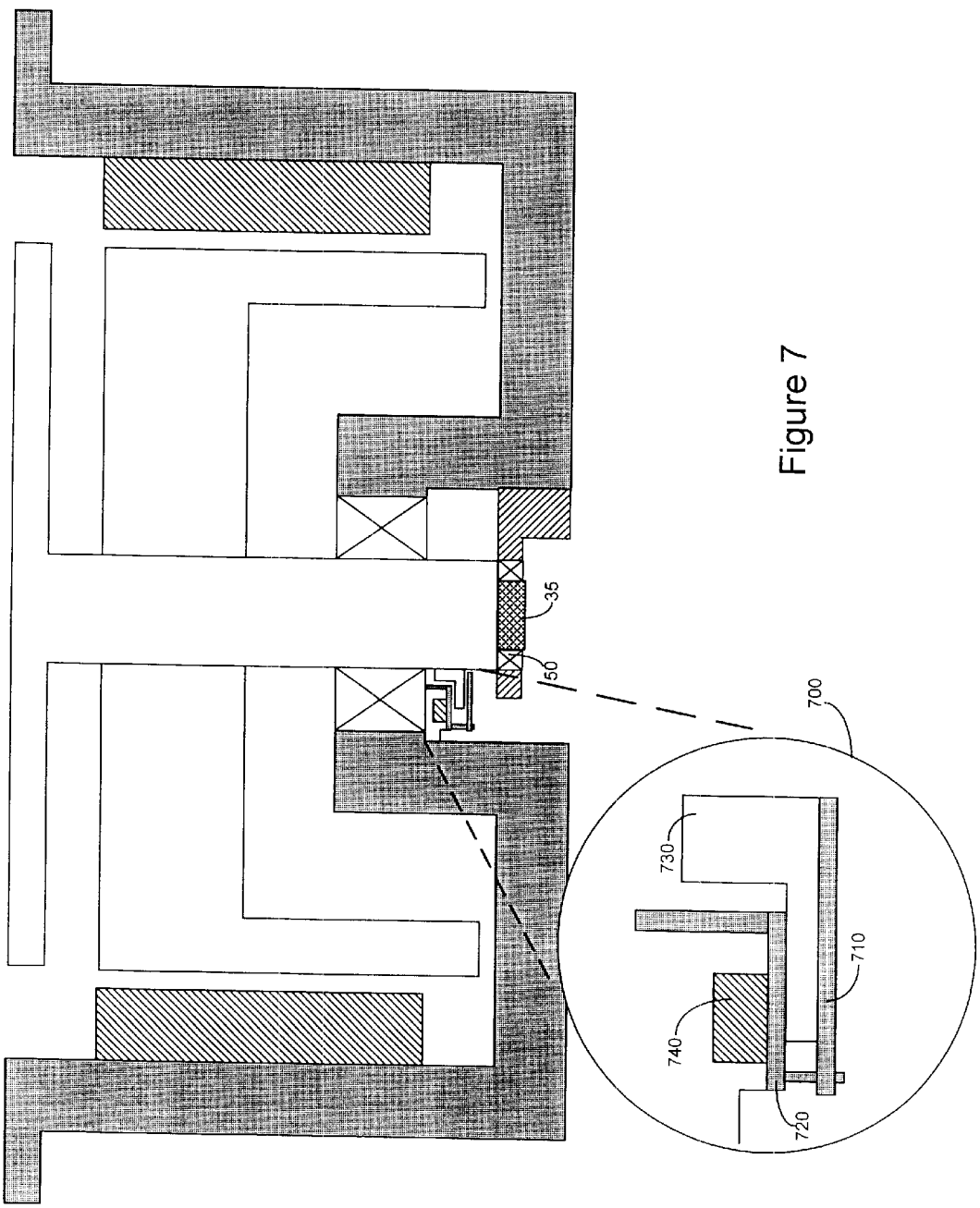
FIG. 7 shows a cartridge motor using a brake as its shipping fastener in accordance with an exemplary embodiment of the present invention.

FIGS. 5, 6 and 7 show cartridge motor implementations that, unlike the previous embodiment, avoid gross axial movement during installation. In these embodiments a gap is maintained between the rotor and the housing. Shipping the motor in this configuration allows for a simplified installation process as it does not require the alternating tightening and loosening of bolts as show in the FIG. 2 embodiment. Rather, the cartridge motor can simply be mounted tightly to the recipient machine and the shipping fasteners can then be removed. With the gap between the housing and the motor maintained the rotor will rotate freely once the fasteners are removed. This gap can be maintained, for example, by the types of fasteners used or the way the fasteners are arranged.

FIG. 5 shows one type of bolt that can be used to maintain a gap between the housing and rotor during shipping. As shown, the bolt has a threaded portion 500 at its tip with a smaller diameter than the rest of the bolt 550. This arrangement enables the threaded portion of the bolt to be mated with a complementary hole in the rotor 18 and then be tightened until the rotor is supported by the larger diameter portion of the bolt.

FIG. 6 shows an alternate system for maintaining a gap between the rotor and the housing that is achieved by arrays of bolts. In this embodiment one set of bolts 600 would only thread through the housing and touch the rotor surface maintaining a space between the housing and the rotor. Then a second set of longer bolts 620 would thread into the rotor and tighten the rotor securely against the first set of bolts 600. A view of the housing looking down the axis of rotation shows white and black circles representing the arrangement short and long bolts respectively.

FIG. 7 shows yet another way to maintain the rotor housing gap during shipment and maintain the proper alignment of the motor and its feedback device. This embodiment uses a brake 700 to maintain the proper rotor gap and to keep the feedback device properly aligned. Brake 700 is a common safety brake, which engages when no energy is applied to it. The brake employs stationary plate 710 and clapper plate 720 to hold the brake rotor 730 in an axially and rotatively locked position. After installation on to the recipient machine the brake can be disengaged and the motor will operate normally via coil 740.

A hybrid of the previously recited examples could be used. For example, the brake could be used to maintain the rotor/housing gap, while one or more bolts are inserted into the rotor to ensure no rotation occurs during shipment.

The many features and advantages of the present invention are apparent from the detailed specification, and thus, it is intended by the appended claims to cover all such features and advantages of the invention which fall within the true spirit and scope of the invention.

Furthermore, since numerous modifications and variations will readily occur to those skilled in the art, it is not desired that the present invention be limited to the exact instruction and operation illustrated and described herein. Accordingly, all suitable modifications and equivalents that may be resorted to are intended to fall within the scope of the claims.

We claim:

1. A cartridge motor comprising:

a housing;

a stator affixed to the housing;

a rotor sharing a common central axis with stator;

a shaft running through the rotor along the common central axis;

a fastener for locking the rotor to the housing during shipment, and thereby maintaining an appropriate gap between the rotor and the stator;

a flexible member connected to the shaft;

a feedback device stator mounted on the cartridge motor such that it is stationary relative to the rotor;

a feedback device rotor connected to the flexible member, whereby the flexible member allows axial and radial adjustments between the shaft and the feedback device rotor while maintaining rotational alignment; and a feedback bearing providing rotational support between the feedback device rotor and the feedback device stator.

2. The cartridge motor of claim 1 wherein:

the housing contains guides for mounting the housing to a recipient machine.

3. The cartridge motor of claim 1 wherein:

the shaft contains guides for mounting the shaft to a recipient machine.

4. The cartridge motor of claim 1 wherein:

the fastener provides an axial force causing the rotor to contact the housing when locked.

5. The cartridge motor of claim 1 wherein:

the fastener locks the rotor to the housing while maintaining a gap between the rotor and the housing.

6. The cartridge motor of claim 1 wherein:

the feedback device stator and feedback device rotor form an encoder.

7. The cartridge motor of claim 1 wherein:

the feedback device stator and feedback device rotor form a resolver.

8. The cartridge motor of claim 1 wherein:

the feedback device stator and feedback device rotor form a tachometer.

9. The cartridge motor of claim 1 wherein:

the feedback device stator and feedback device rotor form an inductosyn.

10. The cartridge motor of claim 1 wherein:

the feedback device stator and feedback device rotor form a sine encoder.

11. The cartridge motor of claim 1 wherein:

the feedback device stator and feedback device rotor form a tape scale.

12. The cartridge motor of claim 1 wherein:

the feedback device and feedback device rotor form a set of Hall Effect sensors.

13. The cartridge motor of claim 1 wherein:

the feedback device is angularly aligned prior to shipment.

14. The cartridge motor of claim 13 wherein:

the flexible member allows axial movement of the rotor while maintaining angular alignment of the feedback device.

15. The cartridge motor of claim 1 wherein:

the motor is a brushless permanent magnet motor.

16. The cartridge motor of claim 1 wherein:

the stator is liquid cooled.

17. The cartridge motor of claim 1 wherein:

the housing is sealed to the environment.

18. A cartridge motor comprising:

a housing;

a stator affixed to the housing;

a rotor sharing a common central axis with the stator;

a shaft running through the rotor along the common central axis;

a fastener that fixes the rotor concentrically with respect to the stator during shipment thereby maintaining an appropriate gap between the rotor and the stator and a gap between the rotor and the housing, wherein the rotor/housing gap prevents gross axial movement during installation.

19. The cartridge motor of claim 18 wherein:

the fastener comprises a bolt with a tip having a smaller diameter than the remainder of the bolt.

20. The cartridge of claim 18 wherein:

the fastener comprises bolts of at least two types with a set of shorter bolts that maintain the space between the rotor and the housing and a set of longer bolts securely tighten the rotor to the shorter bolts.

21. The cartridge motor of claim 18 wherein:

the fastener comprises a brake, which holds the rotor in position.

22. The cartridge motor of claim 21 further comprising:

an additional fastener to prevent any angular movement of the rotor.

23. The cartridge motor of claim 18 further comprising:

a flexible feedback mounting for attaching a feedback device to the motor while maintaining angular alignment but allowing some axial movement.

24. A cartridge motor comprising:

a housing;

a stator affixed to the housing;

a rotor sharing a common central axis with stator;

a shaft running through the rotor along the common central axis;

a fastener for locking the rotor to the housing during shipment, and thereby maintaining an appropriate gap between the rotor and the stator;

a flexible member connected to the housing;

a feedback device rotor connected to the shaft;

a feedback device stator connected to the flexible member, whereby the flexible member allows axial and radial adjustments between the housing and the feedback device stator while maintaining rotational alignment; and a feedback bearing providing rotational support between the feedback device rotor and the feedback device stator.

* * * * *